Patented Apr. 25, 1939

2,156,036

UNITED STATES PATENT OFFICE 2,156,036

ALGINATE IN OLEOMARGARINE

Vernon K. Wilt, Los Angeles, Calif., assignor to Kelco Company, Los Angeles, Calif., a corporation of Delaware No Drawing. Application April 7, 1938, Serial No. 200,733

15 Claims. (Cl. 99—123)

This invention relates to oleomargarine and the process of making same, and the principal object of the invention is to provide an alginate-oleomargarine product having new and novel properties never heretofore obtained in oleomargarines, said properties being obtained at a very nominal cost and same being freedom from "weeping", greater freedom from spoilage, and better texture and flavor. The term "weeping" refers to the leakage of water from oleomargarine which occurs at all temperatures, especially temperatures around 30° to 40° F. When this water leaks out, it carries with it from the oleomargarine some of the commonly used dissolved salts and preservatives, such as sodium benzoate. The removal of these salts and preservatives permits mold and bacteria to readily attack the oleomargarine, thereby causing spoilage, and furthermore such weeping causes the oleomargarine to change flavor, making it unpalatable even prior to actual spoilage.

The leakage of this water moreover stains the cartons containing the oleomargarine, and renders their appearance on dealers' shelves so unsightly that they are often dumped or returned to the factory for reprocessing. The presence of leaking moisture in oleomargarine builds up consumer dissatisfaction, which condition is very undesirable. The presence of this free water is most noticeable at the time the consumer adds the coloring, or when the oleomargarine is being spread on products such as bread.

Furthermore, oleomargarine as heretofore made possessed a very hard texture at low temperatures, which rendered same rather brittle and materially interfered with its spreadability; whereas at a temperature of 80° F. or above, oleomargarine would revert into liquid form, which condition was also undesirable.

Previous attempts to stimulate a buttery flavor and texture in oleomargarine by incorporating milk solids have proven unsatisfactory. Attempts have also been made to improve the texture and prevent leakage by the addition of glycerine derivatives, but the use of these derivatives obscures some of the flavor as it is necessary to use a comparatively high percentage of them to prevent leakage. Besides glycerine derivatives, attempts have also been made to use gelatine for the purpose of preventing weeping and improving the texture, but it has been found the gelatine increases the spoiling rate.

I have found that when alginate is present in the oleomargarine, the product more nearly simulates the texture of butter due to the fact that the brittleness in oleomargarine, which is present at low temperatures, is somewhat reduced and the oleomargarine has less tendency to develop an oily appearance at higher temperatures. This produces a product which has a desirable spreadability through a temperature range not possessed by oleomargarine when not fortified with alginate. Oleomargarine containing alginate also has a mellow buttery flavor not possessed by oleomargarine in which alginate is not present.

One method of preparing my novel alginate-oleomargarine product may be according to the following approximate formula, which will produce 100 pounds of said product:

| | Pounds |
|---|---|
| Sodium alginate | .15 |
| Cottonseed oil | 80.00 |
| Buttermilk | 16.35 |
| Salt | 3.00 |
| Sodium benzoate | .50 |

The cottonseed oil and buttermilk are churned together at a temperature of about 90° F. and the mixture then sprayed into a vat containing ice water. The ice water causes the mixture of oil and buttermilk to solidify and float on the top of the water, from which it is picked up and transferred to a worker table, on which same is worked so that the excess water is removed and the moisture content reduced to around 12%. The resultant oil and buttermilk mixture is then transferred into a blender, in which the moisture content is standardized to approximately 15% by the addition of about 3 lbs. of water in which the above mentioned sodium alginate and sodium benzoate have been dissolved. The salt is added at the blender in dry form. The blender is operated for approximately five minutes, during which time all the constituents are uniformly blended, and the resulting product is of such consistency that it may be easilly packaged.

When as above stated the alginate is first dissolved in water, any water soluble edible alginate may be used. Preferably I employ a water soluble edible alginate salt, such as sodium or ammonium alginate, produced by the process described in the Thornley and Walsh U. S. Letters Patent No. 1,814,981, dated July 14, 1931; or by the process disclosed in the Clark and Green Patent No. 2,036,922, dated April 7, 1936; or in the Green Patent No. 2,036,934, dated April 7, 1936. Other water soluble edible alginates may be employed. We prefer, however, to use a highly polymerized alginate, or one having a high viscosity in a 2% solution, as such an alginate is more efficient.

In place of cottonseed oil I may use coconut oil, whale oil, or any vegetable, animal or mineral oil of similar properties. In place of buttermilk it is possible to use water alone with the alginates, and when this is done, it is sometimes desirable to add some butyric acid flavoring. The sodium benzoate may be left out if desired or other preservatives substituted in place thereof.

Another method of preparing alginate-oleomargarine product is as follows: All of the ingredients mentioned in the previous formulae are mixed together in the churn, and then sprayed on a revolving cylinder which is refrigerated. This eliminates the necessity of working and blending the resulting product. It also dispenses with the necessity of standardizing the water content, as this is accomplished in the churn. The solidified margarine is scraped from the cylinder and packaged. In this method the alginate may either be dissolved in the buttermilk or added to the churn in a water solution. It is recommended however that the buttermilk be reduced to 13.35 lbs., and 3 lbs. of a 5% solution of alginate added thereto to bring the total moisture content up to approximately 15%.

When the alginate is dissolved in buttermilk, it is necessary to use a milk soluble alginate such as disclosed in United States Letters Patent Nos. 2,097,224 and 2,097,225, issued October 26, 1937 to Harland C. Green et al.; or in Patent Nos. 2,097,228, 2,097,230, and 2,097,231, issued October 26, 1937, to Howard J. Lucas; or in Patent No. 2,097,229, issued October 26, 1937, to Howard J. Lucas et al., or one with considerable excess ions which render calcium ions water insoluble.

The percentages of the above disclosed products may all be modified and varied to meet individual tastes and requirements, and I do not wish to limit my invention to the specific percentages stated in the specification.

I claim:

1. Oleomargarine containing an edible water soluble alginate incorporated therein.

2. Oleomargarine containing an edible milk soluble alginate incorporated therein.

3. Oleomargarine comprising an edible oil; butyric acid; salt; and an edible water soluble alginate blended together.

4. Oleomargarine comprising an edible oil; buttermilk; salt; and an edible milk soluble alginate blended together.

5. Oleomargarine comprising an edible oil; butyric acid flavoring; salt; an edible water soluble alginate; and a preservative blended together.

6. Oleomargarine comprising cottonseed oil; buttermilk; salt; and a milk soluble edible alginate blended together.

7. In the process of making oleomargarine, the steps of adding an edible water soluble alginate to the water component thereof; and blending the oleomargarine ingredients.

8. In the process of making oleomargarine, the steps of adding an edible milk soluble alginate to the buttermilk component thereof; and blending the oleomargarine ingredients.

9. The process of making oleomargarine, comprising the steps of churning a heated mixture of an edible oil and butyric acid flavoring; spraying the mixture into chilled water; collecting the floating solid particles of the mixture from the water; removing excess water therefrom; adding a water solution of an edible alginate salt thereto to standardize the water content; adding salt; and blending the above ingredients.

10. The process of making oleomargarine, comprising the steps of churning a heated mixture of an edible oil and buttermilk; spraying the mixture into chilled water; collecting the floating solid particles of the mixture from the water; removing excess water therefrom; adding a water solution of an edible alginate salt thereto to standardize the water content; adding salt; and blending the above ingredients.

11. The process of making oleomargarine, comprising the steps of churning a heated mixture of cottonseed oil and buttermilk; spraying the mixture into chilled water; collecting the floating solid particles of the mixture from the water, removing excess water therefrom; adding a water solution of an edible alginate salt thereto to standardize the water content; adding salt; and blending the above ingredients.

12. The process of making oleomargarine, comprising the steps of churning a heated mixture of an edible oil, salt, and a water solution of an edible alginate; and spraying same against a chilled collector.

13. The process of making oleomargarine, comprising the steps of churning a heated mixture of an edible oil, butyric acid flavoring, salt, and a water solution of an edible alginate; and spraying same against a chilled collector.

14. The process of making oleomargarine, comprising the steps of churning a heated mixture of an edible oil, buttermilk, salt, and a milk soluble edible alginate; and spraying same against a chilled collector.

15. The process of making oleomargarine, comprising the steps of churning a heated mixture of cottonseed oil, buttermilk, salt, and a milk soluble edible alginate; and spraying same against a chilled collector.

VERNON K. WILT.